United States Patent
Clay et al.

(10) Patent No.: US 7,032,028 B2
(45) Date of Patent: Apr. 18, 2006

(54) MULTI-PATH CONTENT DISTRIBUTION AND AGGREGATION

(75) Inventors: Nicholas J. Clay, Pacific Palisades, CA (US); Andrew H. Maltz, Sherman Oaks, CA (US); William E. Elswick, Santa Monica, CA (US)

(73) Assignee: Avica Technology Corporation, Los Angeles, CA (US)

( * ) Notice: Subject to any disclaimer, the term of this patent is extended or adjusted under 35 U.S.C. 154(b) by 628 days.

(21) Appl. No.: 10/091,773

(22) Filed: Mar. 5, 2002

(65) Prior Publication Data
US 2003/0172182 A1     Sep. 11, 2003

(51) Int. Cl.
*G06F 15/173*     (2006.01)

(52) U.S. Cl. ............ 709/238; 709/203; 709/244; 709/231; 709/232; 709/233; 710/38; 710/316; 370/356; 370/542; 370/351; 725/48; 725/49

(58) Field of Classification Search ........... 709/226, 709/238, 239, 203, 224, 231, 232, 233; 710/38, 710/316; 370/356, 542, 351; 725/48–49
See application file for complete search history.

(56) References Cited

U.S. PATENT DOCUMENTS

| | | | | |
|---|---|---|---|---|
| 5,274,782 A | * | 12/1993 | Chalasani et al. ........... 710/317 |
| 5,341,405 A | * | 8/1994 | Mallard, Jr. ................. 375/376 |
| 5,774,672 A | * | 6/1998 | Funahashi et al. .......... 709/231 |
| 5,883,891 A | * | 3/1999 | Williams et al. ............ 370/356 |
| 6,049,829 A | * | 4/2000 | Li .............................. 709/229 |
| 6,084,858 A | * | 7/2000 | Matthews et al. .......... 370/238 |
| 6,253,207 B1 | * | 6/2001 | Malek et al. ............ 707/104.1 |
| 6,434,629 B1 | * | 8/2002 | Stearns et al. .............. 719/320 |
| 6,556,541 B1 | * | 4/2003 | Bare .......................... 370/235 |
| 6,577,653 B1 | * | 6/2003 | Rochberger et al. ........ 370/536 |
| 6,611,874 B1 | * | 8/2003 | Denecheau et al. ......... 709/239 |
| 6,675,253 B1 | * | 1/2004 | Brinkmann et al. ........ 710/316 |
| 6,697,333 B1 | * | 2/2004 | Bawa et al. ................. 370/238 |
| 6,778,496 B1 | * | 8/2004 | Meempat et al. ........... 370/230 |
| 6,788,686 B1 | * | 9/2004 | Khotimsky et al. ......... 370/394 |
| 2005/0152390 A1 | * | 7/2005 | Schroeder et al. .......... 370/432 |

* cited by examiner

*Primary Examiner*—Bharat Barot
*Assistant Examiner*—Shawki S. Ismail
(74) *Attorney, Agent, or Firm*—Mitchell Silberberg & Knupp LLP

(57) ABSTRACT

Communication occurs between a source and a destination over plural communications paths by first identifying content to be sent to a destination via a communications system. After discovering that plural communications paths connecting directly to the destination are available, the content is divided into plural different portions and is transmitted to the destination such that each of the plural different portions is routed via a different one of the plural communications paths.

11 Claims, 3 Drawing Sheets

MULTI-PATH CONTENT DISTRIBUTION AND AGGREGATION

BACKGROUND OF THE INVENTION

1. Field of the Invention

The present invention concerns communications systems, such as the Internet. It is particularly directed to communications systems that distribute content among multiple different communications paths for transmission to a recipient and/or to communications systems that aggregate content from multiple different communications paths into a single composition.

2. Description of the Related Art

Conventionally, a network client or any other entity receiving or downloading a large amount of data via a communications system is limited to downloading such data over a single communications path. For example, a client (or user) on the Internet typically is limited to downloading data from a particular source over a single analog telephone line (via an analog/digital modem), digital telephone line (ISDN or DSL), digital television cable or digital satellite link.

However, the present inventor has discovered that in the case of large data downloads a single communications path might be insufficient for the user's purpose. This is likely to be more and more true as users desire to download larger amounts of data, such as movies or videos, on-demand.

SUMMARY OF THE INVENTION

The present invention addresses this problem by dividing and/or aggregating content across different communications paths to the end user.

Thus, in one aspect the invention is directed to communicating between a source and a destination over plural communications paths by first identifying content to be sent to a destination via a communications system. After discovering that plural communications paths connecting directly to the destination are available, the content is divided into plural different portions and is transmitted to the destination such that each of the plural different portions is routed via a different one of the plural communications paths (e.g., by appropriately addressing the different portions of content).

In a further aspect, the invention is directed to receiving a communication over plural different communications paths. Initially, data are received on each of plural different communications paths. The data on the plural different communications paths are then aggregated into a single composition based on codes embedded within the data.

By dividing and/or aggregating content across different communications paths according to the present invention, it is often possible to communicate more efficiently. In more particularized aspects of the invention, a message is transmitted and/or received indicating: availability and/or capacity of at least one of the communications paths; and/or pricing information for at least one of the plural paths. As a result, even further gains in communications efficiency often can be attained.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

This disclosure is related to, and hereby incorporates by reference herein as though set forth herein in full, each of the following commonly-assigned patent applications: U.S. patent application Ser. No. 09/784,948 filed Feb. 15, 2001 and titled "Paging During Media Loading" (the '948 Application); U.S. patent application Ser. No. 09/784,843 filed Feb. 15, 2001 and titled "Programming Content Distribution" (the '843 Application); and the U.S. Patent Applications titled "Distributed Storage of Audio/Video Content" (the Distributed Storage Application) and "Broadcast Message Management" (the Broadcast Message Management Application) filed concurrently herewith.

Figure 1:
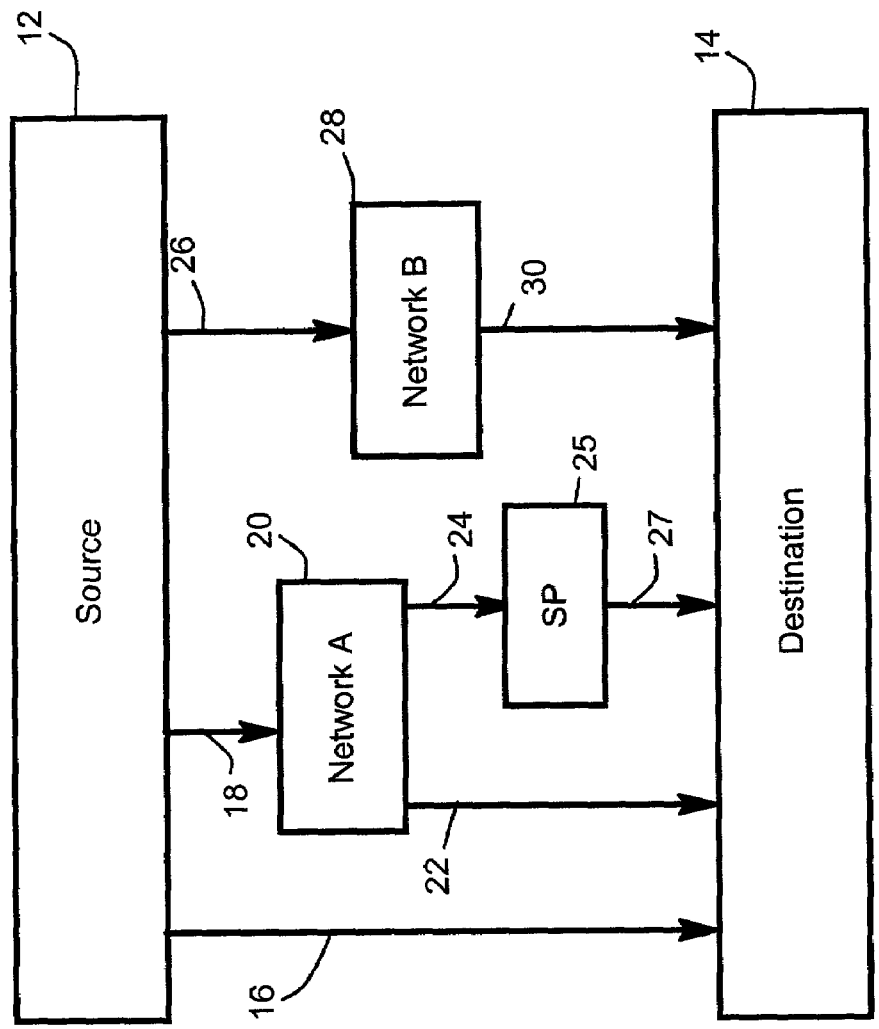
FIG. 1 is a block diagram of a system for implementing techniques of the present invention.

FIG. 1 is a block diagram showing one example of a system 10 that may be used in implementing the techniques of the present invention. Included in system 10 is a source 12 having content for downloading to a destination 14. Source 12 may, for example, be an Internet server or a server on any other network. In this regard, as used herein a "network" might be a single network of interconnected devices or multiple networks interconnected using routers and/or gateways. Destination 14 generally will be a single physical location, such as an individual's home or a place of business (e.g. a single building). However, it is also possible for destination 14 to consist of a number of physical locations linked together by a local network so as to function as a single logical entity.

In the current embodiment of the invention, multiple communications links exist between source 12 and destination 14. For example, a direct communications link 16 permits direct communications between source 12 and destination 14. Link 16 might, for example, be a dial-up telephone modem connection, a direct fiber optic or other physical link, or a direct wireless link.

In addition, source 12 may communicate with destination 14 via a network 20. In a representative embodiment of the invention, network 20 is or includes the Internet. However, any other network may instead be used. Link 18 between source 12 and network 20 may consist of a single path or multiple such paths (e.g., a fiber-optic link to the Internet backbone). Link 22 between network 20 and destination 14 provides a direct communications link (e.g., a fiber-optic link to the Internet backbone). Links 24 and 27, on the other hand, provide communications between network 20 and destination 14 through internet service provider (or another third-party service provider) 25 which, in turn connects to network 20 via link 24. Link 24 might, for example, be a fiber-optic link. Link 27 might, for example, be a T-1 line, a DSL line, a cable connection or a dial-up modem connection.

Still further, source 12 may communicate with destination 14 through any other number of other networks, such as network 28. Links 26 and 30 may be any type of communications link, such as any of those described above for links

16, 18, 22, 24, 25 and 27. Although links 26 and 30 are shown as being direct links to network 28, it should be understood that it is also possible for either source 12 or destination 14 to connect to network 28 via a third-party service provider.

Although all links are illustrated in FIG. 1 as being one-way, this depiction merely shows the direction of the bulk of the communication between source 12 and destination 14 and, in fact, all such links generally will be two-way. However, it is also possible to use different paths for the upstream and downstream communications. For example, destination 14 might send information to service provider 25 via a dial-up connection and receive information from provider 25 via a satellite communications link.

In the following discussion, a path to destination 14 is intended to mean the direct path between the last router or server in any chain of routers and destination 14. This direct path is sometimes called the last mile. Often, such direct paths are the slowest links in a communications network.

Figure 2:
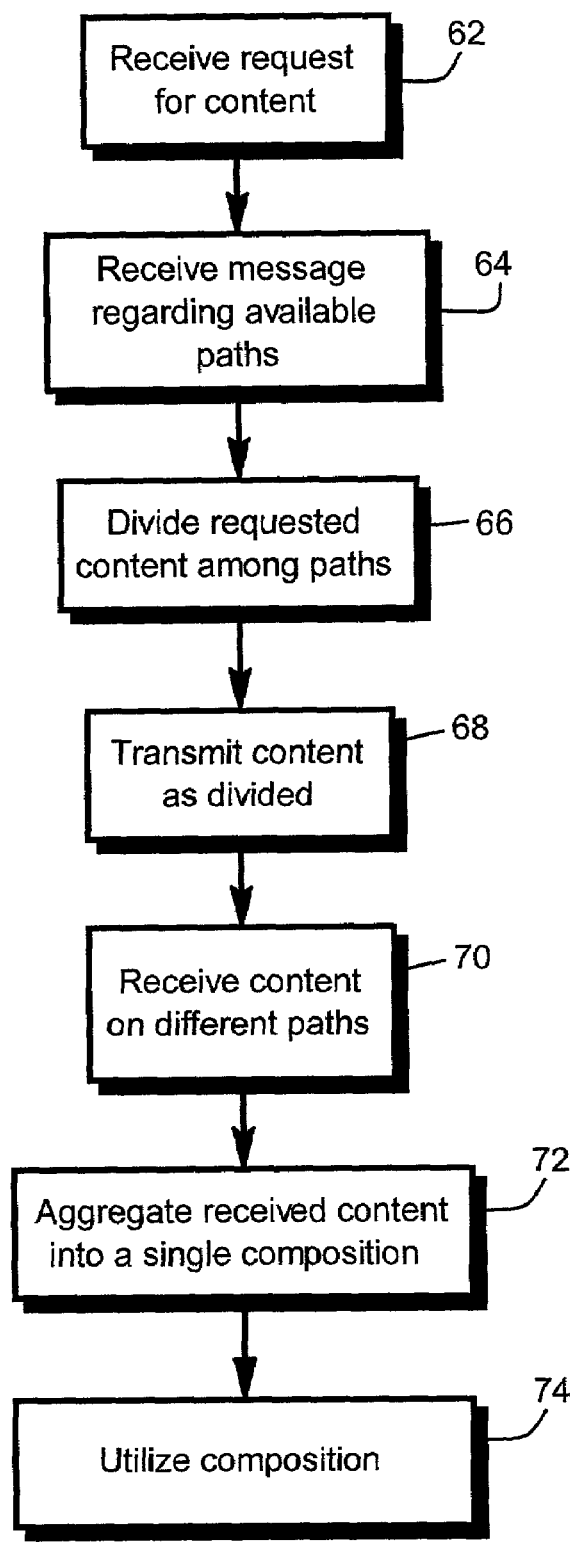
FIG. 2 is a flow diagram illustrating multi-path content distribution and aggregation according to a representative embodiment of the present invention.

FIG. 2 illustrates a flow diagram for explaining techniques for multi-path content distribution and aggregation according to representative embodiments of the present invention. Although the steps of this flow diagram are illustrated in FIG. 2 and described below as being in a particular order, it should be understood that the actual order may in fact be varied and certain of the steps might even be repeated on a periodic basis, meaning that such steps might be performed both earlier and later in the sequence illustrated in FIG. 2. All such variations, to the extent not expressly described below, should be apparent to those skilled in the art.

Initially, in step 62, source 12 receives a request to download content to destination 14. Such a request might be received through any of communications links 16, 18 and 26 illustrated in FIG. 1 and described above (e.g., via the Internet), or may be received in any other manner. Generally, such a request will have been generated and transmitted by destination 14.

In step 64, source 12 receives a message regarding the paths available to destination 14. In one embodiment of the invention, the message received in step 64 has been transmitted by destination 14 to source 12. However, the message may instead be transmitted by one or more third-party service providers 25, or by both destination 14 and any number of such third-party service providers 25. Thus, rather than a single message, multiple messages may be transmitted and received in step 64, preferably covering all of the multiple paths available to destination 14.

Preferably, at a minimum, the message received in step 64 notifies source 12 of the paths that are available and how to access them. For instance, destination 14 might have three Internet connections: one dial-up modem connection to an Internet service provider (ISP) 25, one DSL connection via a different third-party service provider 25, and one cable Internet access connection via a still further third-party service provider 25. Each such different connection generally will have associated with it a different Internet protocol (IP) address. Thus, in the preferred embodiment of the invention, the message(s) transmitted and received in step 64 include at least the IP addresses for such different paths or connections.

More preferably, the message(s) transmitted and received in step 64 also include an indication as to the capacities of such different paths or connections. For example, such message(s) might indicate that the dial-up connection has a capacity of approximately 40 kilobits per second (kbps), that the DSL connection has a capacity of approximately 300 kbps and that the cable connection has a capacity of approximately 600 kbps. Although absolute capacities, such as in the stated example, generally will be preferable, it is also possible for the message(s) to merely indicate relative capacities. For instance, the message(s) might indicate that the content should be transmitted 65% via the cable connection, 30% via the DSL connection and 5% via the dial-up connection. Including an indication of such capacities in such message(s) can permit source 12 to make appropriate decisions as to how the content should be divided among the various paths for transmission to destination 14.

It is noted that the transmitted capacity indications may be fixed based on the type of connection (or path), or instead may be changed as communications link (e.g., traffic) conditions change. Thus, for example, as download speeds increase or decrease over the cable connection, this information may be transmitted to source 12. Such update messages may be transmitted at any regular fixed intervals, may be transmitted upon a triggering event (e.g., an absolute or relative change in download speed exceeding a specified threshold), or any combination of the two. The ability to provide such updated information typically will require monitoring the connections to determine when communication speeds have changed. This function may be performed by (and thus the message(s) sent by) either destination 14 or the applicable third-party service provider 25.

In addition, rather than simply passively monitoring communication rates over the various paths, a more active role may be assumed in managing traffic across the various paths. For example, destination 14 might become aware that one of the communication paths (e.g., the telephone line) is necessary to transmit or receive other content (e.g., an incoming or outgoing telephone call) that can only be transmitted across one or more specific paths (e.g., because the local telephone company is only set up to provide telephone communications across the telephone line). In such a case, capacity on the affected communications paths might be reserved for such content and the message to source 12 modified to indicate that such path(s) are not to be used for receiving the content from source 12 or, alternatively, the message might indicate an appropriately lower capacity (after reserving capacity for such other communication) over such path(s).

In an example of the latter, at the same time that destination 14 is downloading content from source 12, destination 14 might also receive notice that a video program is about to be downloaded via its cable connection. Assuming that such video program can only be downloaded via such cable connection, then either the original message to source 12 or an update message might indicate that the cable connection temporarily has a specified reduced capacity, after reserving such capacity for the video download. Once the video has completed downloading, a further update message may be sent to source 12 indicating that the cable Internet connection capacity has increased to its previous level. Once again, it is noted that the foregoing monitoring and messaging may be performed by either destination 14, third-party service provider 25, any other third party, or any combination of the foregoing.

From the above discussion, it is apparent that the capacity messages sent to source 12 might simply indicate the total capacity for each path or instead might indicate the capacity on each path that is actually available for the current download. In addition, different information might be provided for each path. It is also noted that when providing the capacity indications, any other considerations beyond physical capacity may be provided, or else taken into account, as well.

For instance, to the extent that destination 14 has an arrangement in place whereby it pays fees based on the size of content downloaded, download speed, the time of day that a download is performed, or any combination of the foregoing, such information may be transmitted to source 12 along with explicit or implicit instructions for source 12 to make appropriate cost-effective routing decisions. Alternatively, such information may be used (e.g., by destination 14) in determining the capacity figures that are sent to source 12. As an example of this latter case, the availability/capacity message might simply indicate that the dial-up connection is not available during certain (e.g., peak cost) hours of the day.

Lastly, the message(s) sent to source 12 in this step 64 can be sent via the same communications channel to which they pertain or may be sent via any other communications channel. For example, in certain embodiments of the invention, it might be preferable to communicate all administrative information over a single communications channel (e.g. the relatively low-bandwidth dial-up connection).

In step 66, source 12 divides the requested content among the various available paths using the information that it received in step 64. Moreover, to the extent that the message(s) received in step 64 do not indicate capacities for one or more of the paths leading to destination 14, then such information may be determined directly by source 12 (e.g., by itself monitoring the download speeds over such paths). Thus, the division of content may also or instead be based upon any such information generated by source 12.

If cost information or any other information has been provided in any of the messages received in step 64, then the division of content may also be based on such information, as well as any indication as to how source 12 should divide the content, e.g., whether source 12 should divide to optimize download speed, to minimize cost, or any specified combination thereof. The actual division of content may be performed, for example, using any of the techniques described in the '843 Application.

In step 68, the content as divided in step 66, is transmitted to destination 14 via the respective paths 16, 22, 27 and 30. Generally, this step will be straightforward and can be accomplished by simply addressing each divided portion of the content to its respective path.

Figure 3:
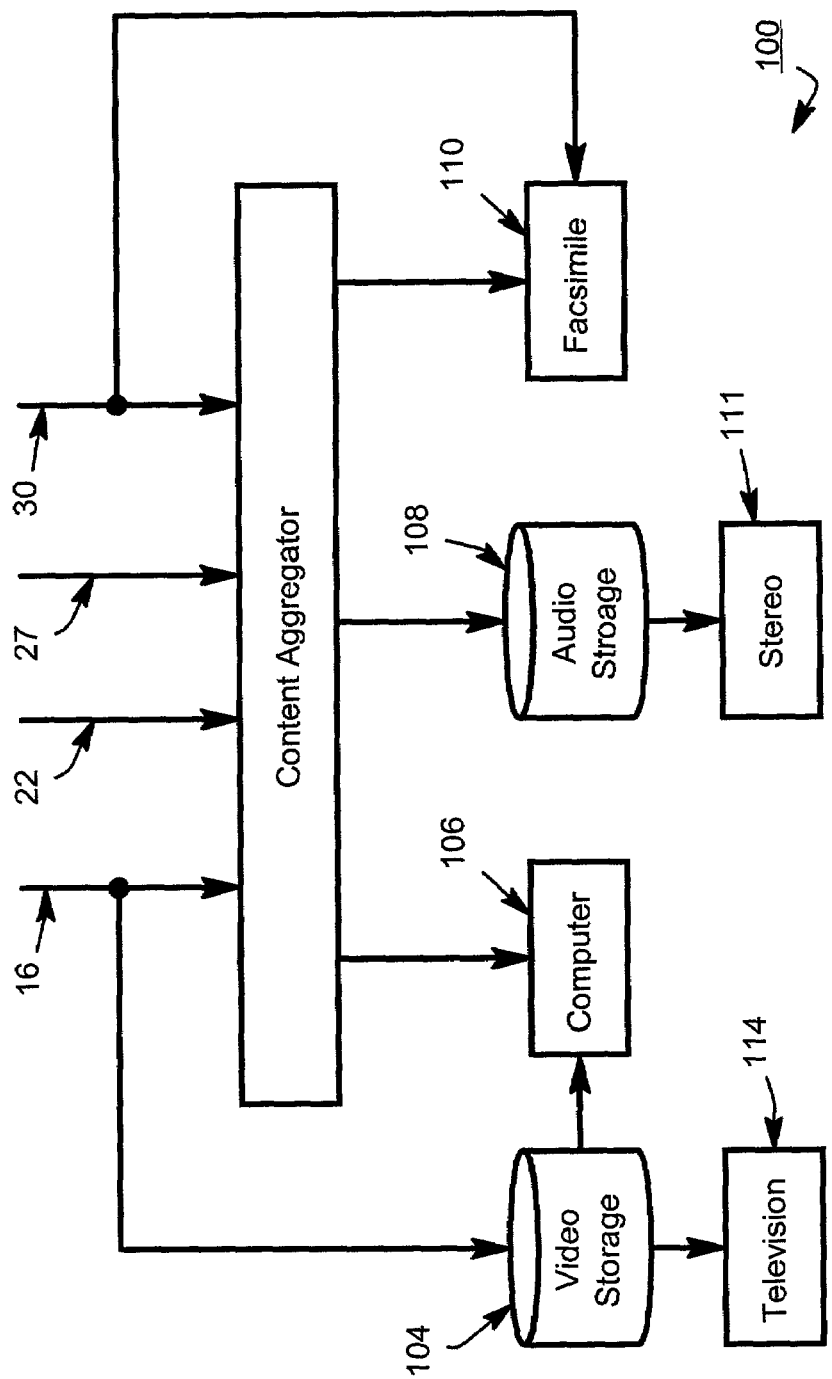
FIG. 3 illustrates a block diagram of a system for use by a content destination according to a representative embodiment of the present invention.

In step 70, the content is received by destination 14 via such paths. A representative system 100 for receiving content at destination 14, according to the present invention, is illustrated in FIG. 3. As shown in FIG. 3, system 100 includes a content aggregator 102 that has multiple inputs corresponding to the multiple paths to destination 14. In a general sense, content aggregator 102 functions as a gateway, receiving data from multiple external sources and providing such data to various devices connected via a local area network (LAN). However, as indicated throughout this disclosure, content aggregator 102 has additional functionality that allows content on multiple different paths to be aggregated and transmitted to a single device as a single composition or data stream. Thus, content aggregator 102 can be implemented using a conventional router that has been modified to include multiple inputs and to have additional programming instructions to perform the functionality described herein.

As shown in FIG. 3, various other components are connected to content aggregator 102 via the LAN, such as a personal computer 106, an audio storage device 108 and a facsimile machine 110. Audio storage device 108 has an output jack for directly connecting to a home stereo 112. Facsimile machine 110, in addition to connecting to content aggregator 102, also connects directly to one of the communications paths to destination 14 (e.g., a telephone line), and therefore can send or receive facsimiles either entirely over a single path (e.g., a telephone line in the conventional manner) or over multiple paths using the techniques described herein. Video storage device 104 also is provided and connects directly to one of the communications paths to destination 14 (e.g., the television cable), and can obtain video program downloads in this manner. As shown in FIG. 3, video storage device 104 provides inputs to television 114 and computer 106.

Returning to FIG. 2, in step 72 the received content is aggregated by destination 14 (e.g., by content aggregator 102) back into the original composition. As noted above, the specific technique for aggregating such content is matched to the division technique performed in step 66 by source 12. As a result, some coordination between source 12 and destination 14 in this regard generally is required. For example, the division/aggregation techniques may be arranged in advance, or communications between the two at the time of downloading may establish the techniques to be used.

In step 74, the reassembled composition is utilized. In this regard, depending upon the type of composition, utilization may, for example, involve: playing the composition on computer 106, television 114 or stereo 112 (e.g. for an audio, video or combined audio and video work); executing the composition on computer 106 (e.g. for software); or displaying the composition on computer 106 or printing the composition on facsimile machine 110 (e.g., for one or more still-frame images).

System Environment

As indicated above, many of the methods and techniques described herein can be practiced with a general-purpose computer system. Such a computer typically will include, for example, at least some of the following components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse or other pointing device, keyboard, microphone or scanner), a mass storage unit (such as a hard disk drive), a real-time clock, a removable storage read/write device (such as for reading from and/or writing to a magnetic disk, a magnetic tape, an opto-magnetic disk, an optical disk, or the like), and a modem (which also may connect to the Internet or to any other computer network via a dial-up connection). In operation, the process steps to implement the above methods typically are initially stored in mass storage (e.g., the hard disk), are downloaded into RAM and then executed by the CPU out of RAM.

Suitable computers for use in implementing the present invention may be obtained from various vendors. Various types of computers, however, may be used depending upon the size and complexity of the tasks. Suitable computers include mainframe computers, multiprocessor computers, workstations, personal computers, and even smaller computers such as PDAs, wireless telephones or any other networked appliance or device. In addition, although a general-purpose computer system has been described above, a special-purpose computer may also be used. In particular, any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Additional Considerations

In the above-described embodiments of the invention, a single composition or work is divided at the source into different components and each component is transmitted to a destination along a different path into the destination. As a result, a single work or composition generally can be downloaded faster than conventional techniques would permit. However, it is also possible to transmit the entire work or composition along a single path with the specific path being selected based on capacity, cost or other information transmitted to the source and/or detected by the source, as described in more detail above.

In a preferred embodiment of the invention, the techniques of the present invention are used to load a movie or other program into a player storage device, as described in the other patent applications incorporated by reference herein. However, the described techniques are general enough to be used in a wide variety of other applications as well.

In the embodiments described above, the communications paths into the destination generally are described as being actual physical communications paths, such as wire or fiber optic cables. However, other paths may be used instead, or in addition. For instance, the techniques of the present invention may be extended to embodiments where at least one of the paths is a wireless link. Furthermore, one or more of the paths might comprise actually delivering one or more physical media (e.g., a DVD) that contains a portion of the content to the destination and then loading such physical media into an appropriate reader at the destination. For most purposes, such alternate communications paths can be treated identically to the other communications paths described above. However, due to the longer latency periods that typically are associated with delivery of physical media, most real-time adjustments to transmission speed and/or content division generally will not be made with respect to that particular communications path (i.e., delivery of physical media).

Although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

What is claimed is:

1. A method for communicating between a source and a destination over plural communications paths, said method comprising:
    (a) identifying content to be sent to a destination via a communications system;
    (b) discovering that plural communications paths connecting directly to the destination are available;
    (c) dividing the content into plural different portions;
    (d) transmitting the content to the destination such that each of the plural different portions is routed via a different one of the plural communications paths;
    wherein different transmission media are used for different ones of plural communication paths; and
    wherein the different transmission media comprise different types of Internet connections.

2. A method according to claim 1, wherein step (b) comprises receiving a message via an electronic communications system that the plural paths are available.

3. A method according to claim 2, wherein the message also indicates a capacity for at least one of the plural paths.

4. A method according to claim 3, wherein the content is divided in step (c) based on the capacity indicated in the message.

5. A method according to claim 3, wherein the message also includes pricing information for at least one of the plural paths.

6. A method according to claim 3, further comprising a step of receiving a second message via the electronic communications system updating the capacity indicated in the message.

7. A method according to claim 1, wherein the communications system comprises an Internet.

8. A method according to claim 2, wherein the message is received from the destination.

9. A method for communicating between a source and a destination over plural communication paths, said method comprising:
    (a) identifying content to be sent to a destination via a communications system;
    (b) discovering that plural communications paths connecting directly to the destination are available;
    (c) dividing the content into plural different portions;
    (d) transmitting the content to the destination such that each of the plural different portions is routed via a different one of the plural communications paths;
    wherein the communication system comprises at least one network, wherein at least some of the plural communications paths are associated with different destination addresses on the at least one network, and wherein step (d) comprises a substep of addressing at least some of the plural different portions to different destination addresses; and
    wherein the different communication paths comprise different types of Internet connections.

10. A method according to claim 1, further comprising at least one of: (i) receiving a message indicating a format for dividing the content, (ii) transmitting a message to the destination indicating a format for dividing the content, and (iii) retrieving a format for dividing the content that has been pre-arranged with the destination.

11. A method according to claim 9, wherein the different destination addresses have been provided by the destination.

* * * * *